March 3, 1964
F. A. KROHM
3,122,770
ARM EXTENSION ADJUSTOR
Filed Jan. 12, 1961
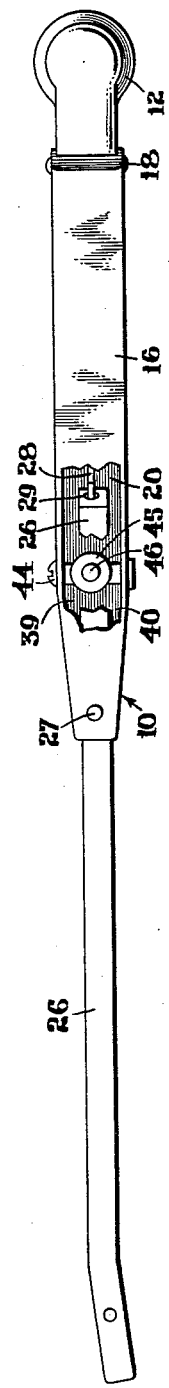
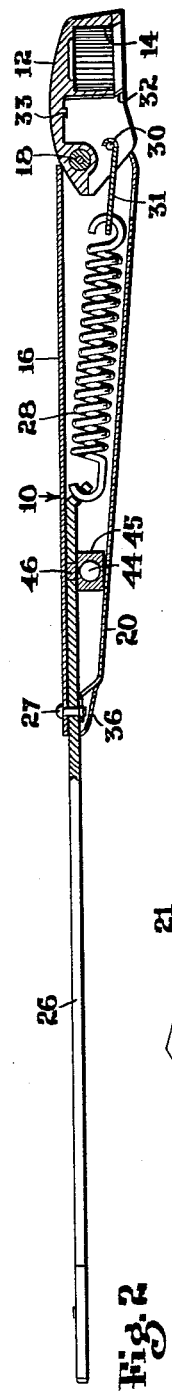
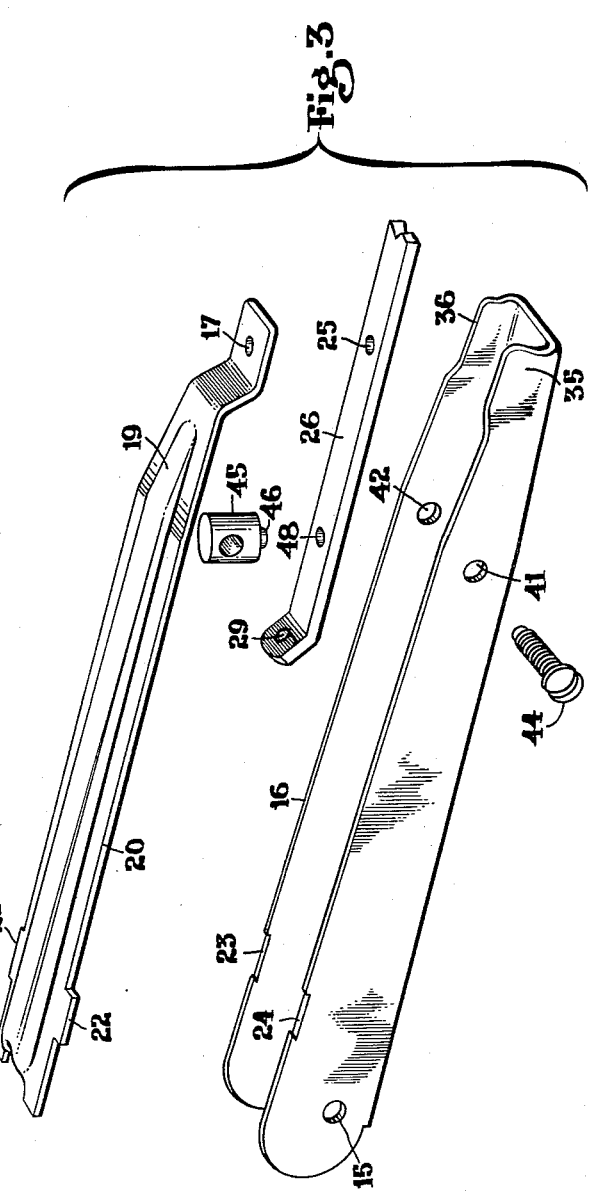
INVENTOR.
FRED A. KROHM
BY W. E. Recktenwald
K. E. Walden
ATTORNEY United States Patent Office 3,122,770
Patented Mar. 3, 1964

3,122,770
ARM EXTENSION ADJUSTOR
Fred A. Krohm, Hobart, Ind., assignor to The Anderson
Company, a corporation of Indiana
Filed Jan. 12, 1961, Ser. No. 82,331
2 Claims. (Cl. 15—250.13)

This invention relates to windshield wiper arms, and more particular to a fine adjustment for laterally adjusting the relative positions of certain portions of a wiper arm.

The designers of present-day automobiles have adopted and used primarily two different connection devices for attaching a windshield wiper arm to the pivot shafts which project from the cowl of the automobile immediately contiguous to the lower edge of the windshield. One connection device consists of a tapered shoulder on the shaft with the end portion of the shaft threaded. A clutch arrangement is provided on the arm end so that the position of the arm can be relatively accurately set with respect to the windshield before the arm is locked to the shaft by a nut member carried by the arm end.

The other connection device takes the form of a splined drum on the end of the pivot shaft wherein a complementary splined cup-shaped head member is provided on one end of the arm to receive and substantially encompass the above-mentioned splined head. The splines extend axially along the surfaces of the arm head and pivot shaft, and each spline consumes approximately 5 degrees of circumference of each surface. It is readily apparent that the arm can be removably positioned at approximately 5 degree increments relative to the drum. With the minimum angular step between adjustments, it is apparent that the end of the arm at the location of the wiping element may vary as much as 2 or 3 inches. Often it is desirable and necessary to be able to position the wiping stroke extremities of the blade to within a fraction of an inch.

Recent models of automobile windshields are cleaned by means of a "tandem" wipe, that is, both blades and arms move in the same direction at the same time. Other automobiles are using an overlap-wipe pattern wherein the blades overlap each other in the central portion of the windshield. The more commonly used system is with the blades moving in opposite directions with both blades being parked at the central portion of the windshield. The position of each blade relative to the other is more critical in some of these systems than in others. For instance, in the overlap-wipe system, if the blades and arms are not properly oriented, interference will result which could cause failure of the whole system.

It is, therefore, an object of this invention to provide an arrangement whereby the angular position of the wiping arm can be minutely adjusted for positioning its attached wiper blade properly.

Another object of this invention is to provide a mechanism for controlling the wiper blade end-stroke position.

Still another object of this invention is to provide an improved wiper arm adapted to position the wiper blade in a parked position near the edge of the windshield.

A further object of this invention is to provide for the proper clearance between pairs of wiping blades as each traverses its wiping stroke.

And a further object of this invention is to provide a simple, economical and durable means for laterally angularly adjusting the relative positions of two portions of a wiper arm, in order to be able to position a wiper blade carried thereby in a properly oriented position when the blade does not happen to fall into this position from the placing of the inner arm portion on the serrated end portion of the shaft.

Other objects and advantages of the invention will become apparent after the description hereinafter set forth is considered in conjunction with the drawing annexed hereto.

In the drawing:

FIGURE 1 is a top view, with portions broken away, of a windshield wiper arm constructed in accordance with the invention;

FIGURE 2 is an elevational view, partially in section, of the device of FIGURE 1; and FIGURE 3 is an enlarged exploded perspective view illustrating how certain parts of the device are assembled.

With reference to the drawing, the windshield wiper arm is generally designated by the numeral 10. An inner shaft-attaching portion or member 12 is provided with a serrated cavity 14 for the reception of the serrated end portion of an oscillatably driven windshield wiper pivot shaft. An intermediate channel member or portion 16 of the wiper arm is pivotally connected to the inner shaft-attaching portion 12 by means of a cross pin or pivot 18, for which one hole 15 is shown in FIGURE 3. The channel portion 16 is provided with a cover 20 having a strengthening raised rib portion 19 and having laterally disposed tongue 21 and 22 thereon which are received and retained in angled recesses 23 and 24, respectively, in the opposed sides of channel portion 16.

An extension member 26 of the windshield wiper arm, which has its outer end portion adapted for connection to a wiper blade (not shown), is pivotally connected near its inner end portion to the channel portion 16 by a rivet 27 which passes through an opening 25 in said portion 26 and which also extends through an opening 17 in cover 20 to retain an offset end of said cover fastened to said channel portion 16. The inner end of the extension member 26 is bent and perforated at 29 to receive one end of a tension spring 28 which has its other end anchored to a cross pin 30 in inner shaft-receiving portion 12 by means of a strap or connector 31. A spring clip 32, swaged at 33 to inner shaft-receiving portion 12, has a lip overhanging the cavity in the inner portion 12 to retain the windshield wiper arm on the end portion of a windshield wiper pivot shaft. The spring 28 tends to rotate channel portion 16 and extension member 26 counterclockwise in FIGURE 2 about pivot 18 with respect to inner arm portion 12 to urge a wiper blade (not shown) carried by the outer end of the extension member 26 toward a windshield, as will be understood by those skilled in the art.

The outer end portions 35 and 36 of the sides of channel portion or member 16 can be crimped over after assembly. The outer end of channel portion 16 is tapered, but in accordance with the invention the relative dimensions of the extension member 26 and channel portion 16 are such that lateral clearance is provided between the edges of the extension member 26 and the sides of channel portion 16, even at the tapered outer end of channel portion 16, when the axes of these two members are aligned. This clearance is indicated at 39 and 40 in FIGURE 1, and is provided to permit a limited amount of lateral angular adjustment between the extension member and the channel member about the vertical axis of rivet 27 by the mechanism now to be described.

The sides of channel portion or member 16 are perforated at 41 and 42 to receive a screw 44 having a slotted-head portion at one end. The other end of screw 44 is swaged over after assembly in a manner preventing movement of the screw axially, but permitting rotation thereof with respect to the channel member 16. Screw 44 is helically threaded substantially from the swaged-end portion to the slotted-head portion. An internally threaded actuating nut member 45 in the shape of a cylinder having a reduced diameter end portion 46 is mounted on screw 44 in cooperating relationship with the threads thereof.

The extension member 26 of the windshield wiper arm is provided with an opening 48 between the openings 25 and 29 which opening 48 is provided for the reception of the reduced diameter end portion 46 of the actuating nut member 45. The nut member 45 is moved in a path transverse to the axis of the arm between the sides of channel portion 16 by the turning of screw 44. The end portion 46 on the nut member 45 engages in the opening 48 in the extension member 26 so as to pivot said extension member 26 through a predetermined angular range about the axis of pivot 27 to properly locate a wiper blade in predetermined position relative to the lower edge portion of a windshield. The angular adjustment of the arm extension member 26 relative to the channel member of the arm is sufficient to permit the wiper blade carried by the outer end portion of the arm to be properly oriented relative to the lower edge of the windshield even though the mating serrations on the pivot shaft and shaft-attaching portion 12 of the arm initially position the arm so that the blade is improperly parked. In addition, with the newer types of wiper systems, wherein the wiper blades both park in the middle of the windshield in overlapping relationship, it becomes critical to proper parking and proper operation of the system to have the blades correctly positioned relative to the edge of the windshield and relative to each other. The present invention permits the arm extension member 26 to be adjusted so as to properly align the blades relative to the edge of the windshield and relative to each other by simply rotating the screw 44 clockwise or counterclockwise, as the case may be.

Having thus described my invention, it is obvious that various modifications may be made in the same without departing from the spirit of the invention; and, therefore, I do not wish to be understood as limiting myself to the exact forms, constructions, arrangements and combinations of parts herein shown and described.

I claim:

1. A windshield wiper arm comprising an inner portion adapted to receive an end portion of an oscillatably driven windshield wiper pivot shaft, a channel portion pivotally mounted on said inner portion for movement toward and away from a windshield, said channel portion having tongue-receiving recesses in opposesd sides thereof, an extension member pivotally connected by a rivet to said channel portion for limited lateral angular movement relative thereto, a helically threaded screw extending through and rotatably mounted in the opposed sides of said channel portion, an actuating nut member mounted on said screw for movement axially thereof between the sides of said channel portion and being operatively connected to said extension member for effecting pivotal movement thereof relative to said channel portion, a tension spring operatively connected between the inner portion and the rest of the arm, and a cover for said channel portion having tongues adjacent one end receivable and retainable in said recesses in the opposed sides of said channel portion and secured at the other end by said rivet forming the pivotal connection between said extension member and said channel portion.

2. A windshield wiper arm comprising an inner portion adapted to receive an end portion of an oscillatably driven windshield wiper pivot shaft, a channel portion pivotally mounted on said inner portion for movement toward and away from a windshield, said channel portion having tongue-receiving recesses in opposed sides thereof, an extension member pivotally connected by a rivet to said channel portion for limited lateral angular movement relative thereto, said extension member having a pair of axially spaced recesses formed in the inner end portion thereof, a helically threaded screw extending through and rotatably mounted in the opposed sides of said channel portion, an actuating nut member mounted on said screw for movement axially of said screw, means carried by said nut member projecting into one of said recesses in said inner end portion of the extension member to establish an operative connection therebetween, a tension spring having one end connected to the other of said recesses in the inner end of said extension member and the other end of said spring operatively connected to said inner portion of the arm at a point spaced from the pivotal connection between said inner portion and said channel portion, and a cover for said channel portion having tongues adjacent one end receivable and retainable in said recesses in the opposed sides of said channel portion and secured at the other end by said rivet forming the pivotal connection between said extension member and said channel portion.

References Cited in the file of this patent

UNITED STATES PATENTS

| | | |
|---|---|---|
| 2,295,620 | Zaiger | Sept. 15, 1942 |
| 2,997,727 | Ziegler | Aug. 29, 1961 |
| 3,006,015 | Zury | Oct. 31, 1961 |
| 3,009,186 | Lenz | Nov. 21, 1961 |
| 3,045,272 | Oishei | July 24, 1962 |